2,956,971

DEFOAMING COMPOSITIONS AND METHOD AND PRODUCTS CONTAINING THE SAME

Shek Ying Lam, San Francisco, Calif., assignor to Francys C. Bresee, administratrix of the estate of Fred Bresee, Jr., Hillsborough, Calif.

No Drawing. Filed Jan. 13, 1958, Ser. No. 708,364

16 Claims. (Cl. 260—23)

This invention relates generally to compositions and procedures for eliminating and controlling objectionable foaming of liquids and liquid systems, particularly latex and latex emulsions used in surface coating compositions.

The so-called latex paints (comprising essentially an oil-water emulsion type system in which a synthetic resin latex is the major film-forming constituent) have had a spectacular growth since their commercial introduction in 1948. As a result, latex or latex emulsions containing various synthetic resins are now being extensively manufactured and sold for use in formulating various products, including paints. Probably the most widely used latices in the art of surface coatings are the various butadiene-styrene copolymers. Latices of polyvinyl chloride are also widely employed.

In the processing, handling and use of products and compositions containing such latices, foaming has been a serious problem. In the field of surface coatings, foaming is not only a problem during processing and handling of the latex emupsions, but presents a particular problem during application to a surface. Any amount of foaming at this time may seriously interfere with the smoothness of the applied coating. The problem is sufficiently critical that some very promising formulations have had to be discarded because of the foaming properties induced by certain of the ingredients.

Various materials and compositions have been employed to solve this foaming difficulty, some with considerable success. A particularly useful group of defoaming compositions is disclosed, for example, in U.S. Patent 2,773,041, assigned to Balab. Although highly successful with the more conventional latices, for example as mentioned above, these and other defoaming compositions have not been able to cope with the foaming problem presented by certain otherwise promising synthetic latex emulsions. Latex emulsions particularly referred to are the polymers of acrylic acid esters (known as the acrylic rubbers), and polymers of polyvinyl acetate. As surface coatings these materials impart good flex resistance, excellent resistance to oil and to high temperatures, unlimited oxygen resistance, and low permeability to gases. To date, however, they have resisted all efforts to solve a serious foaming problem presented by their use. A solution to the foaming problem presented by these latices is therefore highly to be desired.

In general, it is an object of the present invention to provide a defoaming composition and procedure which will provide a practical solution to the above problem, and to many additional problems as will appear.

Another object of the invention is to provide a defoaming composition and procedure which can be successfully used with a wide variety of latex emulsions, including the polymers of acrylic acid esters and polyvinyl acetate, and which will have a substantially permanent defoaming effect.

Another object of the invention is to provide a defoaming composition of the above type which can be used in latex emulsions without in any way interfering with use of the emulsion for various purposes, such as formulating paints.

Another object of the invention is to provide a latex emulsion which has been treated by addition of a composition such as described above, and which is characterized by a high degree of resistance to foaming.

Additional objects and features of the invention will appear from the following description in which the preferred embodiment of the invention has been set forth in detail.

The defoaming compositions of the present invention consist essentially of a dispersion in oil of a metallic soap along with a secondary amine derived from mixed fatty acids and a non-ionic surfactant, principally an aliphatic polyhydric alcohol ester. In the preparation of my new defoaming compositions, the metallic soap and secondary amine can be advantageously added to a small quantity of the oil, with mild heating, and then be blended without heating with the additional oil and the remaining ingredients. As an alternative to this practice, the soap and amine may be heated together with the oil to effect the dispersion, although the resulting dispersion is somewhat less stable. It is not intended that the invention be limited to any particular technique of forming the compositions, however, since their effectiveness in suppressing and elimination of foam is in no way dependent upon the physical characteristics of the dispersions formed.

When my composition is to be used in the suppressing or controlling of foam formation in latex paints and similar surface coatings, it is desirable that an additional quantity of a polyglycol be added, for example, a polypropylene glycol. Such ingredients has unexpectedly been found to materially improve the hiding qualities and ease of application of the resulting coating composition.

My new compositions have been found to be very effective in the suppressing and controlling of foam formation in latex emulsions, even though employed in relatively small amounts, and seem to have a substantially permanent effect. When used in latex paints, the defoaming compositions are preferably added directly to the pigments prior to ball malling, the resultant mixture being subsequently added to the latex emulsion. However, they can also be added to a fully formulated paint composition, with equivalent lasting defoaming properties.

Desired results can be obtained in accordance with the present invention by the use of specific ingredients which conform to many other necessary requirements. Thus the oil dispersion can be prepared from any one of a wide variety of relatively inexpensive, readily available oils. For example, the light petroleum distillates such as the various grades of kerosene, so-called mineral or white oil, and similar petroleum fractions can be successfully employed. It is also possible to use various vegetable oils such as cottonseed, sesame, coconut, peanut, castor, corn oil and the like. Also, animal oils can be employed, such as sardine or other fish oil, lard and tallow. Preferably the oil selected should be sufficiently purified and refined to avoid the introduction of objectionable contaminants.

The term metallic soap as used herein refers to the so-called water-insoluble soaps, comprising the metal salts of mixed saturated fatty acids having from about 8 to about 18 carbon atoms which are insoluble in water. Metallic soaps found to be particularly useful in carrying out the present invention include most of the commonly available metallic stearates such as aluminum, calcium, copper, magnesium and zinc stearates. Metallic salts of other of the fatty acid constituents of commercial fats and oils (e.g. oleic acid, linolenic acid, palmitic acid, etc.) can also be present in varying proportions in the soaps.

Normally these ingredients are more soluble in oil than in water, and consequently tend to stabilize emulsions of the water-in-oil rather than the oil-in-water type. As used in the dispersions of the present invention however, they apparently contribute unexpectedly to the stability of oil-in-water emulsions and latices in which they are employed. Moreover, the metallic soaps appear to combine with the other ingredients, in some way not fully understood, to provide the desired foam suppressing characteristic. This co-action is apparent from the fact that dispersion of the metallic soaps in an oil, and without the other ingredients specified above, will produce no appreciable defoaming effect.

It is desirable to employ an agent capable of acting as an emulsifying agent when the defoaming composition is added to a latex emulsion or paint. Compositions found satisfactory for this purpose include the non-ionic surfactants which are completely esterified polyoxyalkylene polyhydric alcohol fatty acid esters. The oxyalkylene group is preferably an oxyethylene or oxypropylene group and as polyhydric alcohols which may be employed in the formation of the surfactants may be mentioned glycerol, ethylene glycol, sorbitol or mannitol. By way of example, polyoxyethylene sorbitol-hexa-oleate (approximate molecular weight 2000 to 6000), and polyethylene glycol-di-oleate (approximate molecular weight 200 to 600) have been found to be particularly suitable.

I have found it desirable to employ in small proportion a secondary amine mixed fatty acids, such as found in tallow, coconut oil, soybean oil, and the like. Such secondary amines are commercially produced, for example, by the Armour Chemical Division of Armour & Co., Chicago, Illinois, under the trade designation Secondary Armeens. These compositions are essentially aliphatic secondary amines comprising 85% or more of long chain fatty acid radicals of 16 to 18 carbons in length, and have an apparent molecular weight no less than about 490. A particularly satisfactory composition, derived from hard tallow is Armeen 2Ht. The distribution of long chain alkyl radicals in this composition is 25% hexadecyl (16 carbons) and 75% octadecyl (18 carbons).

In addition to the foregoing ingredients, it is frequently desirable when formulating latex paints to employ a quantity of a suitable polyglycol, for example, a polypropylene or polybutylene glycol, or a mixture of such polyglycols such as a mixture of polyethylene and polybutylene glycol. I have had particular success with the polypropylene glycols of intermediate molecular weight (formed for example by the addition of propylene oxide to water or propylene glycol). In general, these polypropylene glycols have a structural formula as follows:

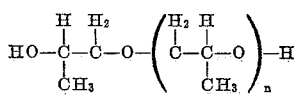

When added to a latex paint formulation these polyglycols have been found to unexpectedly increase the ease of application and the hiding quality of the resulting paint formulation. One composition particularly useful in the present invention is Polyglycol P1200, manufactured by the Dow Chemical Company.

In general, and assuming that the defoaming composition is formulated from an oil, a metallic soap (e.g. a heavy metallic stearate), having long chain alkyl groups, a secondary amine, a non-ionic surfactant (e.g. a completely esterified polyoxyalkylene polyhydric alcohol fatty acid ester), and a polyglycol (e.g. a polypropylene glycol), the proportions may range as follows:

| | Percent |
|---|---|
| Oil | 45 to 95 |
| Secondary amine | 0.5 to 10 |
| Dispersing agent | 0.5 to 10 |
| Non-ionic surfactant | 1.0 to 10 |
| Polyglycol | 5 to 50 |

The foregoing general range of ingredients is specified to make clear that the invention is not limited to certain of the ingredients, or to a specific proportioning of ingredients as may be disclosed herein by way of example.

As previously indicated, the desired defoaming properties of the above compositions can be utilized by adding them in small quantities either to a formulated composition, for example, to a latex paint, or to various components of such formulated composition. For example, in the treatment of latex paint it is sometimes desirable to add the defoaming composition to the pigments prior to the customary ball milling. This sequence tends to prevent the undesirable results of foaming during such initial processing, without in any way detracting from the defoaming properties of the composition in the final paint. Where a foaming problem is present in the handling of a particular latex, as in the case of the acrylic latices, the defoaming composition can advantageously be added directly to the latex emulsion. The defoaming compositions can also be successfully added to paint formulations presently on the market, and made without the benefit of the present invention.

The following examples are illustrative of the practice of the present invention. For convenience in these examples, all proportions are expressed as percent by weight.

*Example 1*

One very satisfactory defoaming composition has been formulated as follows:

| | Percent |
|---|---|
| Refined mineral oil ("white oil," vis. 90–100 cps. at 20° C.) | 77 |
| Magnesium stearate | 2 |
| Armeen 2HT (Armour Chemical Division of Armour & Co., Chicago, Illinois) | 2 |
| Polyoxyethylene sorbitol-hexa-oleate | 4 |
| Polypropylene glycol P1200 (Dow Chemical Company, Midland, Michigan) | 15 |
| | 100 |

In formulating the above ingredients, 2 grams of magnesium stearate were heated with 10 grams of white oil to 120° C. Thereafter 40 grams of white oil were slowly added cold to the heated ingredients. The oleate and polypropylene glycol were then added in succession. Separately, 2 grams of Armeen 2HT were heated with 10 grams of white oil to 70° C. To this were slowly added cold 40 grams of white oil. The separate mixtures were then combined slowly, the resulting blend being at a temperature of about 40° C.

The composition was also prepared by heating all of the white oil to dispersion temperatures of the stearate and secondary amine, with only the last two ingredients being added cold. The dispersions produced were not quite as stable, but were equally effective as defoaming agents in synthetic latices and formulated paints.

EXAMPLE 2

As another specific example, a defoaming composition has been prepared in substantially the following proportions:

| | Percent |
|---|---|
| Refined mineral oil ("white oil," vis. 90–100 cps. at 20° C.) | 70 |
| Aluminum stearate | 5 |
| Secondary amines having alkyl groups derived from mixed coconut fatty acids | 5 |
| Polyethylene glycol 400 (Di) Oleate (Glyco Products Co., Inc., Brooklyn, N.Y.) | 8 |
| Polypropylene glycol (P1200) | 12 |
| | 100 |

The above ingredients were formulated substantially as in Example 1.

EXAMPLE 3

As a further example, a defoaming composition has been prepared in the following proportions:

| Ingredient | Percent |
|---|---|
| Kerosene | 65 |
| Zinc stearate | 7 |
| Secondary amines having alkyl groups derived from mixed soybean fatty acids | 7 |
| Mixed fatty acid esters of polyoxyethylene sorbitol (Atlox 1045A, Atlas Powder Co.) | 10 |
| Polypropylene glycol (P1200) | 11 |
| | 100 |

The above ingredients were again formulated substantially as in Example 1.

The above and similar compositions have been found to be highly effective defoaming agents when added to synthetic latex emulsions, including for example, the conventionally employed latices of butadiene-styrene and and polyvinyl chloride co-polymers. More important, the new defoaming compositions have proved remarkably effective when used with polymer emulsions of the acrylic ester resins, including the polymerized ester derivatives of both acrylic acid and alpha methyl acrylic acid (and particularly the lower esters represented by the methyl, ethyl and butyl esters and their copolymers). The new defoaming compositions have also proved unusually effective with latices of polyvinyl acetate. These results are especially significant in view of the fact that the acrylate and methacrylate and polyvinyl acetate latices have heretofore resisted all attempts to control serious foaming conditions normally inherent in their use. As a result an entire new group of surface coating compositions can now be brought into effectual use.

A primary usefulness of the new defoaming compositions is in the control or prevention of foaming in formulated latex paints employing the above latices. Thus latex paint formulations can be completely protected from foam formation by the addition of my new defoaming compositions in amounts of no greater than about 0.03 to 1.0% of the total weight of the formulated paint. Moreover, the defoaming action obtained is substantially permanent. In other words, after having added the defoaming composition, no further foaming tendencies of the paints is exhibited even upon repeated subsequent agitation, or extended shelf storage.

The following examples are typical of the treatment of latex paint formulations with the defoaming compositions of the invention.

EXAMPLE 4

A foam controlled latex paint was prepared in accordance with the invention, employing an acrylic rubber latex in the following proportions.

(A) Pigment mix

| Ingredients: | Amount, percent |
|---|---|
| Defoaming composition of Example 1 | 0.33 |
| Pigment dispersant (Tamol 731, Rohm & Haas Co.) | 8.92 |
| Wetting Agent (Triton CT–10, Rohm & Haas Co.) | 0.33 |
| Hydroxy ethyl cellulose (2% in water) | 4.13 |
| Ethylene glycol | 2.48 |
| Preservative | .08 |
| Titanium dioxide | 37.14 |
| Calcium carbonate | 28.85 |
| Clay | 12.38 |
| Water | 5.36 |
| | 100.00 |

(B) Base emulsion

| Ingredients: | Amount, percent |
|---|---|
| Defoaming composition of Example 1 | 0.37 |
| Acrylic ester polymer emulsion (Rhoplex AC–33, 46% solids, manufactured by Rohm & Haas, Philadelphia, Pa.) | 65.32 |
| Water | 8.40 |
| Calcium chloride (10% solution in water) | 17.15 |
| Tributyl phosphate | 2.80 |
| Hydroxy ethyl cellulose (2% in water) | 4.66 |
| Ammonium hydroxide | 1.30 |
| | 100.00 |

The ingredients of A are mixed thoroughly to form a paste. When good pigment dispersion has been obtained in the paste, 6 to 7% additional water can be added and the watered mixture passed through a high speed mill. The base emulsion (B) is then added to the resultant pigment mixture, slowly and with thorough agitation, in the proportion of about 4 pounds of base emulsion (B) to about 5 pounds of the initial mix (A). The total defoaming composition present in the paint thus formulated is about 0.35% by weight.

EXAMPLE 5

A latex paint containing polymers of polyvinyl acetate is as follows:

| Ingredients: | Amount, percent |
|---|---|
| Defoaming composition of Example 2 | 0.045 |
| Polyvinyl acetate emulsion (12K51, National Starch Products Inc.) | 33.16 |
| Potassium tri poly phosphate | 0.185 |
| Titanium dioxide | 18.40 |
| Silica | 9.22 |
| Talc | 9.22 |
| Water | 27.62 |
| Hexylene glycol | 1.84 |
| Methylcellulose (Methocel – 4000, Dow Chemical Co.) | 0.23 |
| t-Octyl phenoxyethanol non-ionic surfactant (Triton X–100, Rohm & Haas Co.) | 0.09 |
| | 100.000 |

The t-octyl phenoxyethanol and the methyl cellulose are dispersed in about one-sixth of the water. The potassium tri polyphosphate is dissolved in the remainder of the water along with the titanium dioxide, silica and talc. The two water solutions are then mixed and the polyvinyl acetate emulsion and defoaming composition added. The entire mixture is then passed through a suitable mill (Morehouse) to obtain a thorough mixing and dispersion of the formula.

In compounding the above latex paint formulation, no foaming took place during the processing and milling of the paint. After extended shelf storage, the paint when used exhibited no foaming tendencies.

From the above it will be apparent that my new defoaming compositions are of great value in facilitating the manufacture and in the processing of a wide variety of latex emulsions, and particularly latices of the acrylic and polyvinyl acetate type. Moreover, it solves a serious foaming problem that has to date substantially prevented any widespread manufacture of latex paints employing these latex emulsions. My new compositions also greatly facilitate the treatment of existing paint formulations, since they can be introduced directly into the various mixtures offered for sale by paint manufacturers. In other words, my compositions can be added to latex emulsions before they are sold to the trade, or they can be incorporated with ingredients, or directly into a final formulated composition.

To those skilled in the art to which this invention relates, many changes and procedures and widely differing embodiments and applications of the invention will suggest themselves without departing from the spirit and scope of the invention. For example, although the description has related primarily to the treatment of latex emulsions and latex paints, it will be understood that the principles of the invention are applicable to a wide variety of solutions and liquors where foaming constitutes a serious use or processing difficulty. Thus the defoamers of the invention can be used to prevent foaming in various spray applications, for example in the spraying of various fungicides and insecticides in agricultural and commercial operations. They are also useful in the prevention of foam in proteinaceous liquors encountered in the manufacture and processing of protein glues, and in sulphite and other liquors encountered in the wood pulp industry, etc. Accordingly, it should be understood that the disclosures and descriptions herein are purely illustrative and are not intended to be in any sense limiting.

I claim:

1. A non-aqueous composition having defoaming properties comprising: from 45 to 95% of an oil having dispersed therein 0.5 to 10% of a water-insoluble metallic soap, 0.5 to 10% of secondary amines having alkyl groups derived from mixed fatty acids selected from the group consisting of hard tallow, coconut and soybean fatty acids, and 1 to 10% of a completely esterified polyoxyalkylene polyhydric alcohol fatty acid ester, the composition being capable of inducing a marked, immediate and sustained defoaming action when added to water emulsions and latices normally susceptible to foaming.

2. The composition in accordance with claim 1 in which there is also dispersed from 5 to 50% of polypropylene glycol having a molecular weight of the order of 1200.

3. The composition of claim 1 in which said secondary amines have a distribution of long chain alkyl radicals of approximately 25% hexadecyl and approximately 75% octadecyl.

4. The composition of claim 1 wherein said ester is a polyoxyethylene sorbitol hexaoleate.

5. The composition of claim 1 in which said ester is a polyethylene glycol dioleate.

6. The composition of claim 1 in which said metallic soap is magnesium stearate.

7. The composition of claim 1 in which said metallic soap is aluminum stearate.

8. A surface coating composition characterized by a high degree of resistance to foaming, said composition comprising a latex emulsion of polymers normally highly susceptible to foaming but having dispersed therein from 0.03 to 1.0% by weight of a non-aqueous defoaming composition comprising from 45 to 95% of an oil having dispersed therein 0.5 to 10% of a water-insoluble metallic soap, 0.5 to 10% of secondary amines having alkyl groups derived from mixed fatty acids selected from the group consisting of hard tallow, coconut and soybean fatty acids, and 1 to 10% of a completely esterified polyoxyalkylene polyhydric alcohol fatty acid ester.

9. The surface coating composition of claim 8 wherein said polymers comprise polymers of acrylic acid esters.

10. The surface coating composition of claim 8 wherein said polymers comprise polyvinyl acetate.

11. The surface coating composition of claim 8 wherein said defoaming composition also has dispersed therein from 5 to 50% of polypropylene glycol having a molecular weight of the order of 1200.

12. The surface coating composition of claim 8 wherein said secondary amines have a distribution of long chain alkyl radicals of approximately 25% hexadecyl and approximately 75% octadecyl.

13. The surface coating composition of claim 8 wherein said ester is a polyoxyethylene sorbitol hexaoleate.

14. The surface coating composition of claim 8 wherein said ester is a polyethylene glycol dioleate.

15. The surface coating composition of claim 8 wherein said metallic soap is magnesium stearate.

16. The surface coating composition of claim 8 in which said metallic soap is aluminum stearate.

References Cited in the file of this patent

UNITED STATES PATENTS

| 2,425,828 | Retzsch et al. | Aug. 19, 1947 |
| 2,660,567 | Cunder et al. | Nov. 24, 1953 |
| 2,773,041 | Larsen et al. | Dec. 4, 1956 |

OTHER REFERENCES

Chemical Abstracts, vol. 46, 5751C (1952).